United States Patent [19]
Imus

[11] Patent Number: 5,160,668
[45] Date of Patent: Nov. 3, 1992

[54] METHOD FOR FORMING OPTICAL ELEMENTS HAVING AN OPTICAL COATING BY REPLICATION OF A MOLD

[75] Inventor: Mark H. Imus, Sausalito, Calif.

[73] Assignee: Optical Coating Laboratory, Inc., Santa Rosa, Calif.

[21] Appl. No.: 758,297

[22] Filed: Aug. 28, 1991

Related U.S. Application Data

[63] Continuation of Ser. No. 446,482, Dec. 5, 1989, abandoned.

[51] Int. Cl.5 ............................................. B29D 11/00
[52] U.S. Cl. .................................... 264/1.7; 264/2.5; 264/338; 427/133
[58] Field of Search ............. 264/1.4, 1.7, 1.9, 2.3, 264/2.5, 338; 427/133, 135; 425/808; 249/134

[56] References Cited

U.S. PATENT DOCUMENTS

| | | | |
|---|---|---|---|
| 2,241,415 | 5/1941 | Moulton | 264/2.3 |
| 4,061,518 | 12/1977 | Burroughs et al. | 264/1.9 |
| 4,919,850 | 4/1990 | Blum et al. | 264/1.4 |

FOREIGN PATENT DOCUMENTS 109630  7/1982  Japan ........................... 264/1.9

Primary Examiner—James Lowe
Attorney, Agent, or Firm—Flehr, Hohbach, Test, Albritton & Herbert

[57] ABSTRACT

Method for forming an optical element having an optical coating thereon by replication having the steps of preparing first and second molds having polished surfaces which are to be replicated, depositing a soluble inorganic salt to form a release layer, depositing an optical coating in reverse order upon the release layer, supplying liquid material between the molds and in contact with the optical coating, causing the liquid material to solidify and form a bond with the optical coating, separating the molds from the solidified material with the optical coating adherent to the solidified material with separation occurring between the mold and the optical coating in the parting layer and removing any remaining portions of the parting layer from the optical coating.

6 Claims, 1 Drawing Sheet

METHOD FOR FORMING OPTICAL ELEMENTS HAVING AN OPTICAL COATING BY REPLICATION OF A MOLD

This is a continuation of application Ser. No. 07/446,482 filed Dec. 5, 1989 and now abandoned.

This invention relates to a method for forming optical elements and more particularly to a method for forming optical elements having an optical coating by replication from a mold.

At the present time, certain companies such as Vision Sciences of Monrovia, Calif. 91016 have introduced an office or on-site lens casting system in which opthalmic lenses are cast in molds by injecting liquid plastic formulations such as CR39 monomer to a cavity formed by front and rear molds which have been provided with interior polished mold surfaces for the finished surfaces of the lenses. The plastic is cured in the mold and then the mold is separated to yield a completed ophthalmic lens which meets a selected prescription. Such a lens then can be ground around the edge to fit into the selected frame. A need has arisen to provide lenses made in this manner with antireflection coatings on the front or outside surface of the lens and also on occasion on the inside or rear surface of the lens. This has meant that the eyeglasses must be shipped to a different facility which can provide such antireflection coatings which requires additional time and expense. There is therefore a need for a method for forming on site such eyeglasses with an optical coating. It is well known that adhesion of vacuum deposited coatings to their substrates is in general difficult and sensitive to process techniques in various other parameters. These difficulties are exacerbated when the substrate is a polymer such as a mono and dibasic acid based allylesters, which are inherently more difficult to clean and more limited in their vacuum, glow discharge and process temperature compatibilities. In situ cleaning temperatures which are desired to improve adhesion must be performed so that they do not degrade the substrate.

In U.S. Pat. No. 4,061,518 there is disclosed a method for making an article having a replicated coating with a durable dielectric overcoat. It has been found that the method disclosed therein is not particularly applicable to the making of ophthalmic eyeglasses because silicon is utilized as a parting compound which only can be utilized at relatively low temperatures. A protective hard overcoat utilized therein requires a post curing operation. There is therefore a need for a method which will overcome these difficulties.

In general, it is an object of the present invention to provide a method for forming optical elements having an optical coating by replication from a mold and an optical assembly for use in the same.

Another object of the invention is to provide a method of the above character in which optical coatings can be provided on the front or outside surfaces as well as the inside or rear surface of optical elements such as ophthalmic eyeglasses.

Another object of the invention is to provide a method of the above character in which the optical elements can be cast on site utilizing a lens casting system.

Another object of the invention is to provide a method of the above character particularly suited for making ophthalmic lenses on site.

Another object of the invention is to provide a method of the above character in which dust and defects in the optical element are much more difficult to see.

Another object of the invention is to provide a method of the above character in which the optical coatings are placed on the published surfaces of the molds or on the polished surfaces of inserts placed in the molds prior to casting of the optical elements.

Another object of the invention is to provide a method of the above character which does not require the use of silicon oil as a parting agent.

Another object of the invention is to provide a method of the above character which utilizes a parting or release material which can withstand the elevated temperatures incurred during casting of the optical element.

Another object of the invention is to provide a method of the above character which utilizes a parting or release material which is non-reactive to the polymer being cured.

Another object of the invention is to provide a method of the above character in which a durable and stable optical coating on the optical element can be provided.

Another object of the invention is to provide a method and an assembly of the above character in which an optical multilayer structure adheres preferentially to the surface of the optical element.

Another object of the invention is to provide a method of the above character in which the optical coating is formed in an inverted fashion on polished surfaces of the mold or insert.

Another object of the invention is to provide a method of the above character for manufacturing ophthalmic lenses having optical coatings thereon without the need for subsequent grinding and polishing to achieve a particular ophthalmic prescription.

Another object of the invention is to provide a method of the above character which can be utilized with single and multifocal prescriptions ophthalmic lenses.

Another object of the invention is to provide a method of the above character which permits spectral measurement verification of the reversed design of the optical coating prior to a transfer step.

Another object of the invention is to provide a method of the above character which permits the selection of various front and back surfaces to create an optically coated (i.e. AR or UV/IR sunglass reflector) ophthalmic lens element at the point of sale or on site thereby eliminating the need for post grind and arrangements for vacuum deposition.

Another object of the invention is to provide a method which permits placement of the optical coating in only specific surface area of the ophthalmic lens.

Another object of the invention is to provide a method of the above character which makes possible a manufacture of a completed optical element with an optical coating thereon at the point of sale site thereby significantly reducing the required handling time and costs.

Another object of the invention is to provide a method of the above character which permits the transfer of the optical coating for the ophthalmic lens at a different location and time as required.

Another object of the invention is to provide a method of the above character which utilizes a dissolvable material as a release layer permitting transport and storage as well as spectral measurement prior to transfer of the optical coating.

Additional objects and features of the invention will appear from the following description in which the preferred embodiments are set forth in detail in conjunction with the accompanying drawings.

In general the method for forming optical elements having an optical coating thereon by replication from a mold is comprised of the steps of preparing first and second molds having polished optical surfaces facing each other and which are to be replicated in the optical element. The polished surfaces are sufficiently hard and inert to withstand the casting step. The surfaces are free of oil and large dust particles. A thin optical parting or release layer of soluble inorganic salt is deposited on one of the polished surfaces. Alternatively, it can be deposited on the polished surface of an insert fitted to the mold. The inorganic salt is capable of withstanding the temperature encountered in the casting step. The desired optical coating is deposited in reverse order on the release or parting layer. When an optical element is desired the molds with the desired characteristics with the desired optical coatings thereon are selected and are placed in a conventional gasket assembly to provide a space between the molds. A liquid monomer is placed in the space and is cured to provide an optical element with an excellent bond being formed between the cast optic and the optical coating. The molds are then separated with the optical coating separating from the mold along the release layer to provide the desired optical element.

In the optical assembly, first and second molds having polished optical surfaces facing each other are provided. A release layer formed of a soluble inorganic salt is adherent to the optical surface of the mold. An optical coating formed in reverse order is carried by the release layer. A cast in place optic is disposed between the molds and has good adherence to the optical coating. Thereafter any remaining material of the release layer is washed off.

Figure 1:
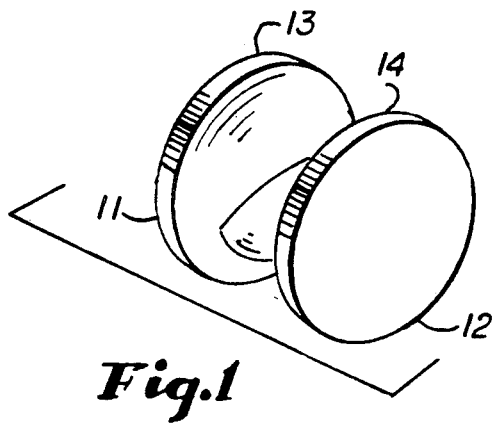
FIG. 1 is a perspective view of a pair of molds utilized for making an optical element such as an ophthalmic lens in accordance with the present invention.
Figure 3:
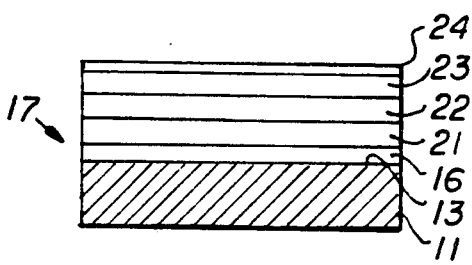
FIG. 3 is a cross sectional view of the mold and optical coating formed thereon.

More in particular in connection with the present invention to provide a method and an optical assembly for use in an on-site lens casting system in which antireflection coatings (AR coatings) and ultraviolet and infrared coatings (UV/IR) can be provided on optical elements as, for example, on ophthalmic lenses. Thus, as shown in FIG. 1, for each optical element as, for example, an ophthalmic lens to be prepared, front and back molds 11 and 12 are prepared and have front and back polished optical surfaces 13 and 14 which are ground and polished to have the desired characteristics, as for example, of an ophthalmic lens prescription.

The molds 11 and 12 can be formed of any suitable material which is capable of withstanding the processing temperatures hereinafter utilized in conjunction with the method and which can provide polished surface of the type required for the optical elements being prepared. Glass and nickel plated metal have been found to be suitable materials. Also electroless nickel castings and plated surfaces thereon can be provided to obtain the desired hardness and inertness to subsequent casting procedures. A plastic such as RYTON, a polyphenylen sulfide can also be utilized for this purpose.

The molds after they are prepared with their polished surfaces are shipped to a facility where an optical coating can be applied in a vacuum deposition process to the polished surfaces of the molds 11 and 12 in accordance with the present invention. It may be desirable to clean the mold prior to the vacuum deposition process. This can be done by washing the mold in soap and water and, if desired, followed by an alcohol rinse. Alternatively, an ultrasonic cleaner can be utilized. A release layer 16 is first deposited on the surface 13. In accordance with the present invention, the release layer 16 is of the ionic type and is in the form of a release enhancing vapor deposited layer such as a water soluble inorganic salt which is deposited as the initial layer in the vacuum deposition process. Samples of such materials are sodium chloride (NaCl), cryolite (NaAlF), potassium fluoride (KF), calcium fluoride (CaF) and calcium chloride (CaCl). When cryolite is used, it can be deposited to a thickness of approximately $\frac{1}{4}$ to $\frac{1}{2}$ wavelength at a 550 nanometer design wavelength. The parting and release layer 16 is an optical layer and can have a thickness ranging from 80 Angstroms to 5 microns with 400 to 600 Angstroms being the preferred thickness. The parting or release layer utilized in connection with the present method is characterized in that it is vacuum deposited. It also is compatible with the optical coating thereafter vacuum deposited. It will not diffuse during subsequent deposition operations. It is compatible with subsequent casting processes used with the molds. It has weak adherence to the surface of the mold with good adherence to the optical coating to be deposited thereon. It also is soluble, preferably in water so that it can be readily removed.

It is also desirable to control the thickness of the release or parting layer in order to minimize the amount of time required to deposit the coatings in the vacuum chamber. It is important to obtain complete coverage of the mold surface to allow even separation of the subsequent multilayer antireflection coating from the mold surface. It is advantageous to use a vacuum deposited release or parting layer because the release layer and the optical coating to be thereafter deposited can all be vacuum deposited in the same vacuum without the necessity of breaking vacuum in the vacuum chamber until all of the layers have been deposited.

After the release layer 16 has been deposited, it is followed immediately by the multilayer antireflection optical coating 17 which can be of a conventional type, as for example, one comprised of four layers 21, 22, 23 and 24 which are deposited in a reverse order that they will have on the final optical element as shown in FIG.

3. Two different materials, one, a high index material and the other, a low index material are utilized. Alternate layers are formed of one material and the other layers are formed of the other material. The materials utilized should not be dispersive and should be transparent in the visible. Materials found to be suitable for this purpose are titanium dioxide as a high index material having a high index of refraction of approximately 2.2 and silicon dioxide as a low index material, having an index of refraction of approximately 1.45. Typically the layer 21 can have a thickness of 826 Å, layer 22 a thickness of 1126 Å, layer 23, a thickness of 275 Å, and layer 24, a thickness of 118 Å.

Such an antireflection coating will minimize a reflection in the visible region. At the same time it is possible to provide a residual reflection to give a color or tint to the optical element. For example, the reflectance can be readily tailored so as to give a very light green tint to the lenses.

It should be appreciated that since two surfaces are available on the optical element, as for example, on an ophthalmic lens, the coating may be split between the two surfaces by placing certain of the layers of the coating on the front surface 13 of the front mold 11 and other of the layers of the coating on the back surface 14 of the mold 12.

Also if desired, it should be appreciated that in addition to the multilayer antireflection coating, other coatings can be provided as, for example, an ultraviolet reflecting coating. Such an ultraviolet coating or stack is visibly transparent and can be utilized to eliminate ultraviolet radiation which may be harmful to the eye. Also such an ultraviolet coating can be combined with an infrared reflective coating to reduce the heat level transmitted through the optical element as for example, to ophthalmic lenses, thus reducing fatigue to the wearer of eyeglasses utilizing such ophthalmic lenses. In addition, sunglass coatings can be provided which can be in the form of an absorber with a dielectric layer to achieve a desired reflectance. Alternatively, a dyed or absorbent substrate can be provided to achieve the desired color. A layer or multiple layers of a dielectric can be used in conjunction with an absorbing substrate in order to achieve a colored sunglass with a saturated reflection of the color desired, such as violet, blue or orange. Sunglass coatings of this type are well known and can be utilized in conjunction with the present method. Such sunglass coatings can range anywhere from one layer of several quarterwaves or up to 30 or more layers.

After the molds 11 and 12 have been provided with the desired optical coating or coatings, they can be shipped back to the original manufacturer of the molds which can then ship the molds to on-site lens casting facilities where they can be used to fill ophthalmic lens requirements.

When a customer arrives at an eyeglass facility with a prescription, the eyeglass facility can select the desired molds as, for example, front and rear molds 11 and 12 and place them in a gasket assembly to enclose a space or mold cavity therebetween which is to receive from the molten material which is to form the optical element. The mold cavity then can be filled with a desired resin, as for example, CR-39, a diethylene glycol bis (allyl carbonate) monomer. Other suitable plastics can also be used. Also, molten glass can also be used. If plastic is used, the plastic is thermally cured in a water bath for an appropriate period of time through a controlled temperature cycle 2 to 16 hours in length and preferably three hours or less.

After the curing has been completed, the gasket mold assembly is moved from the water bath. The gasket assembly is removed from the molds to thereby transfer by direct adhesion to the solidified resin forming the optical element 26 the optical coating, which previously had been placed on the polished surface(s) of the mold. The molds can then be separated and the optical element 26 removed from the mold with the multilayer antireflection coating 17 forming a part of the optical element 26 with separation taking place in the weakly bound release or parting layer 16. The optical element 26 can then be taken and dipped in water or lightly rinsed in water to dissolve any remaining portions of the water soluble parting layer 16.

Figure 4:
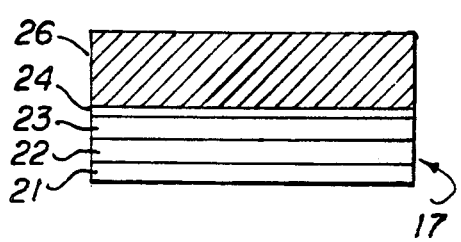
FIG. 4 is a cross sectional view showing the optical coating after transfer to the optic.

Thus there is provided the optical construction which is shown in FIG. 4 in which the multilayer interference coating 17 is strongly bound to the solidified resin forming the optical element 26. The optical element serves as a lens which after the customer selects a pair of frames can have the edges ground to meet the requirements of the frames and mounted in the frames to provide the eyeglasses desired by the customer.

Eyeglasses in which the opthalmic lenses have been provided with such a multilayer antireflection coating have several advantages. The light transmitted is increased by reducing the amount of reflected light. This is even more important in plastic than in glass because of the slightly higher index of refraction of glass. Enhancing transmission through the ophthalmic lenses serves to reduce eyestrain both to the wearer of the eyeglasses because there is reduced glare into the eye from behind the lenses and also to the person looking at the eyeglasses. This also makes it possible for the other person to see the eyes of the wearer of the eyeglasses instead of the reflected surface of the eyeglasses. The overall effect by reducing reflection creates as close as possible an appearance that there is actually no glass between the observer and the person's eyes.

In addition as pointed out above, it may be desirable to provide an optical coating for the wearer which reduces transmission of unwanted wavelengths. This can be done typically by either reflection or absorption. In the case of the CR39 plastic much of the infrared and most of the ultraviolet is absorbed in the material although there is some transmission in the ultraviolet. Utilizing such a material, the multilayer coating can be designed to reflect ultraviolet.

It has been found that with the invention of the present method that when a precast liquid polymer is utilized as an optical element the polymer serves as an agent to encapsulate and make much less visible any small particles of unwanted dust or other particles on the surface of the optical coating on the mold. This significantly reduces the level of sophistication required at the transfer facility as, for example, at an eyeglass dispenser. It has been found that the adherence between the antireflection coating 17 and the polymer as the polymer solidifies is excellent and that it is only with great difficulty that any of the antireflection coating 17 can be removed from the plastic optic 17. For example, such optical elements having antireflection coatings thereon have been found to readily pass 500 cheesecloth rubs with no degradation. Because of the excellent adhesion achieved the optic element and the antireflection coating 17 have been found to provide good moisture durability.

Figure 2:
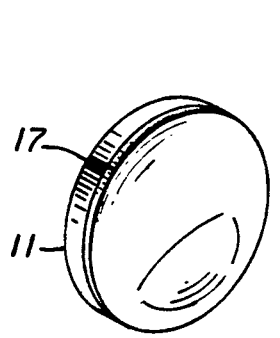
FIG. 2 is a perspective view of one of the molds having a polished surface with an optical coating formed thereon in the reverse order.
Figure 5:
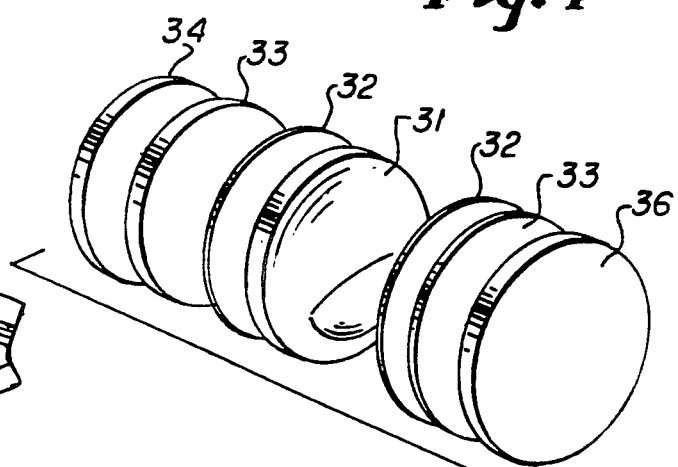
FIG. 5 is an exploded view of an optical assembly utilizing the method of the present invention in which the optical coatings are deposited upon inserts which are fitted into the molds.

It should be appreciated that, if desired, the multilayer antireflection coating can be deposited on an insert which is placed in the mold and then the optic element formed thereafter. Such a method is shown in FIG. 5 in which the optical element 31 is in the form of a bifocal ophthalmic lens to which is adhered the four antireflection layers forming the coating 32. In the manufacture of this optical element, the optical coating is deposited upon an insert 33 which can be formed of a suitable material such as plastic. The insert 33 which is utilized is formed of a compatible polymer which is pre-shaped to the master mold surface. This insert can be coated in a low temperature process with the release layer and the multilayer optical coating. This insert 33 is used to effect the desired transfer of the optical coating to the optic 31. As in the previous method, the multilayer interference coating 32 is deposited in reverse order upon the parting or release layer (not shown) of the type hereinbefore described. The insert conforms to the configuration of the mold. The front and back halves 34 and 36 serve as a mold and are used in the same manner as the front and back molds 11 and 12 in FIG. 1 and 2 and receive the liquid material which is to form the ophthalmic lens 31. The antireflection coating 32 will adhere to the optic 31, the parting occurring in the release layer between the antireflection layer 32 and the insert 33.

Figure 6:
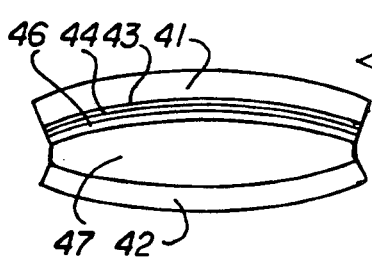
FIG. 6 is a perspective view showing an optical assembly in which an ultraviolet cement is used in the method or process.

Another embodiment of the invention is shown in FIG. 6 in which front and rear molds 31 and 32 are provided which have polished mold surfaces of the type hereinbefore described. Assuming that only an antireflection coating is desired on the optical element which is to be made, a parting or release layer 43 of the type hereinbefore described is deposited on the polished surface followed by the optical coating 44 which can be a multilayer antireflection coating deposited in a reverse order in a vacuum coating chamber. After the optical coating has been deposited, the mold can be removed from the vacuum coating chamber and thereafter an ultraviolet cement 46 in liquid form is applied to the optical coating 44. The ultraviolet cement is cured in a conventional manner by the use of ultraviolet radiation in the range of 370 to 400 nanometers. Curing of the liquid ultraviolet cement causes a change from a liquid to a solid phase. This solidified cement is capable of withstanding the temperatures encountered in the subsequent molding operation for the making of the optical element 47 in the manner hereinbefore described.

Figure 7:
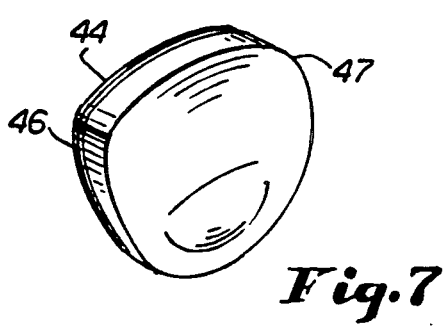
FIG. 7 is a perspective view showing the optical element formed from the assembly shown in FIG. 6 with the edges ground to form an opthalmic lens.

After the molding operation has been completed, the molds 41 and 42 can be separated from the optical element 47 leaving the optical coating 44 directly adherent to the optic 47 and with the ultraviolet cement 46 adherent to the optical coating. Any residual portions of the parting or release layer can be washed off in the manner hereinbefore described. The ultraviolet cement which remains typically is harder than a plastic optic 47 and provide a more durable surface for the optic 47. The optical element can have its edges ground to provide an ophthalmic lens of the desired configuration to fit a frame of the frames selected by the prospective user as shown in FIG. 7.

It can be seen from the foregoing that there has been provided a method for forming optic elements having an optical coating by replication of a mold or molds. The present invention provides a method for producing optical quality, multilayer coatings of dielectrics and/or metals on substrates that are cast or combined with a surface polymer layer which can be applied separately by a process such as spinning or use of a doctor blade.

The process or method, although it has been described principally in connection with the making of ophthalmic lenses for eyeglasses, the same techniques can be utilized for making other optical elements such as camera lenses, optics, contrast enhancement filters, display windows, instrument panels and data disks and which may utilize single or multilayer optical coatings for spectral control of transmission, reflection and absorption. The use of inserts is particularly desirable in connection with powered optics, such as camera or ophthalmic lenses. The optical coatings are deposited onto the mold surfaces which can be of a metal, glass or compatible plastic or onto a separate substrate herein called an insert which conforms to the mold shape sufficiently to replicate the mold master surface and completely transfers the desired optical coating to the desired surface during the polymer curing process, such as a thermal or ultraviolet curing process. A release enhancing vapor deposited layer preferably formed of a soluble inorganic salt deposited as the initial layer during vacuum deposition is subsequently removed in a water bath following transfer.

The use of precoated mold made in accordance with the present invention or alternatively coated mold inserts enable the coated optical element to be prepared in one step during casting.

What is claimed is:

1. In a method for forming an optical element having a multilayer optical coating thereon by replication, preparing a first mold having a polished surface which is to be replicated, said surface being sufficiently hard and inert to withstand a casting operation, the surface being generally free of oil and large dust particles, vacuum depositing a soluble inorganic salt to form an optical release layer having an optical thickness, depositing a multilayer optical coating in reverse order upon the release layer, supplying liquid material to the mold and in contact with the optical coating, causing the liquid material to solidify and form a bond with the optical coating, separating the mold from the solidified material with the optical coating adherent to the solidified material with separation occurring between the mold and the optical coating at the release layer and removing the release layer from the optical coating.

2. A method as in claim 1 wherein a plastic insert is used which conforms to the polished surface of the mold and wherein the release layer and the multilayer optical coating are applied to the plastic insert in a low temperature process suitable for use with the plastic insert.

3. A method as in claim 1 wherein the release layer is applied directly to the polished surface of the mold.

4. A method as in claim 1 in which the release layer is deposited to a thickness ranging from 80 Angstroms to 5 microns.

5. A method as in claim 4 in which the release layer has a thickness of 400 to 600 Angstroms.

6. A method as in claim 1 in which cryolite is used as the inorganic salt and is deposited to a thickness ranging from $\frac{1}{4}$ to $\frac{1}{2}$ wavelength at a 550 nanometer design wavelength.

* * * * *